United States Patent [19]

Svenning

[11] 4,324,528
[45] Apr. 13, 1982

[54] AUTOMATIC REGULATING DEVICE FOR KEEPING CONSTANT THE SPEED OF WIND-POWERED PROPELLERS

[75] Inventor: Sven G. W. Svenning, Partille, Sweden

[73] Assignee: Sven Svenning Konsult AB, Partille, Sweden

[21] Appl. No.: 924,052

[22] Filed: Jul. 12, 1978

Related U.S. Application Data

[63] Continuation-in-part of Ser. No. 897,241, Apr. 18, 1978, abandoned, which is a continuation of Ser. No. 683,895, May 6, 1976, abandoned.

[30] Foreign Application Priority Data

May 12, 1975 [SE] Sweden .................................. 7505407

[51] Int. Cl.³ ............................................... F03D 7/04
[52] U.S. Cl. ................... 416/132 B; 416/135; 416/140
[58] Field of Search .................. 416/135, 136, 132 B, 416/140, 137, 138, 139 A, 131

[56] References Cited

U.S. PATENT DOCUMENTS

| 1,633,842 | 6/1927 | Bishop | 416/132 B X |
|---|---|---|---|
| 1,829,062 | 10/1931 | Schneider | 416/243 |
| 2,047,776 | 7/1936 | Hafner | 416/135 B |
| 2,928,653 | 3/1960 | Roberson | 416/136 |
| 3,220,484 | 11/1965 | Elmer | 416/136 X |
| 3,594,097 | 7/1971 | Mouille | 416/136 X |
| 3,953,149 | 4/1976 | Henne | 416/136 |
| 4,029,434 | 6/1977 | Kenney | 416/139 A X |

FOREIGN PATENT DOCUMENTS

| 456963 | 5/1949 | Canada | 416/242 |
|---|---|---|---|
| 62885 | 11/1944 | Denmark | 416/131 |
| 365197 | 12/1922 | Fed. Rep. of Germany | 416/131 |
| 805388 | 5/1951 | Fed. Rep. of Germany | 416/44 A |
| 1145241 | 11/1958 | Fed. Rep. of Germany | 416/136 |
| 1048154 | 12/1958 | Fed. Rep. of Germany | 416/136 |
| 1058863 | 3/1954 | France | 416/138 R |
| 1149452 | 12/1957 | France | 416/135 A |
| 2311196 | 12/1976 | France | 416/140 |
| 332451 | 11/1935 | Italy | 416/136 |
| 57405 | 5/1936 | Netherlands | 416/136 |
| 124935 | 4/1919 | United Kingdom | 416/132 B |
| 541206 | 11/1941 | United Kingdom | 416/136 |

Primary Examiner—Everette A. Powell, Jr.
Attorney, Agent, or Firm—Brumbaugh, Graves, Donohue & Raymond

[57] ABSTRACT

This invention relates to an automatic regulating device for wind-powered propellers having blades which are connected to the propeller hub by torsion springs and are self-adjustable in dependence of the wind forces acting on the blades and returnable by action of the torsion springs. The distinctive feature of the invention is that the torsion spring connecting each blade with the propeller hub has a substantial portion of its length pre-stressed between two abutment points situated on a radius from the propeller axis and radially spaced from each other. The abutment points permit twisting the blade about its longitudinal axis from an initial position by wind forces against action of the prestressed torsion spring. The abutment points are both fixed either in relation to the blade or in relation to the hub.

11 Claims, 9 Drawing Figures

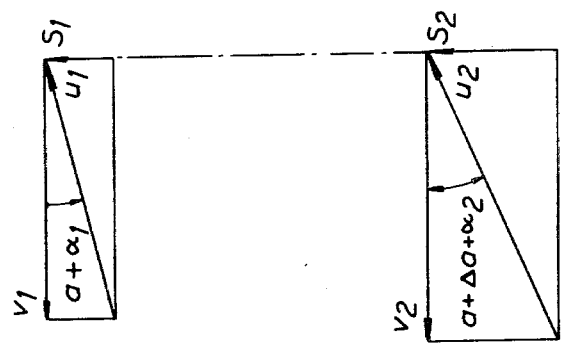
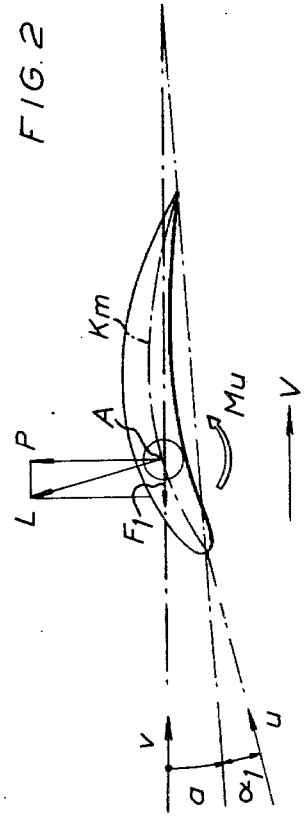
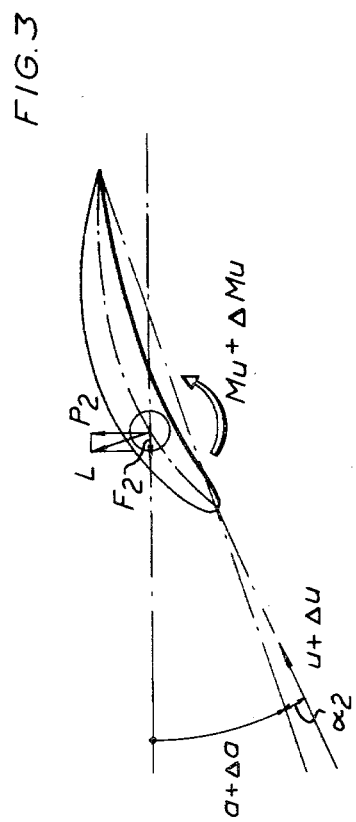
FIG. 2
FIG. 3

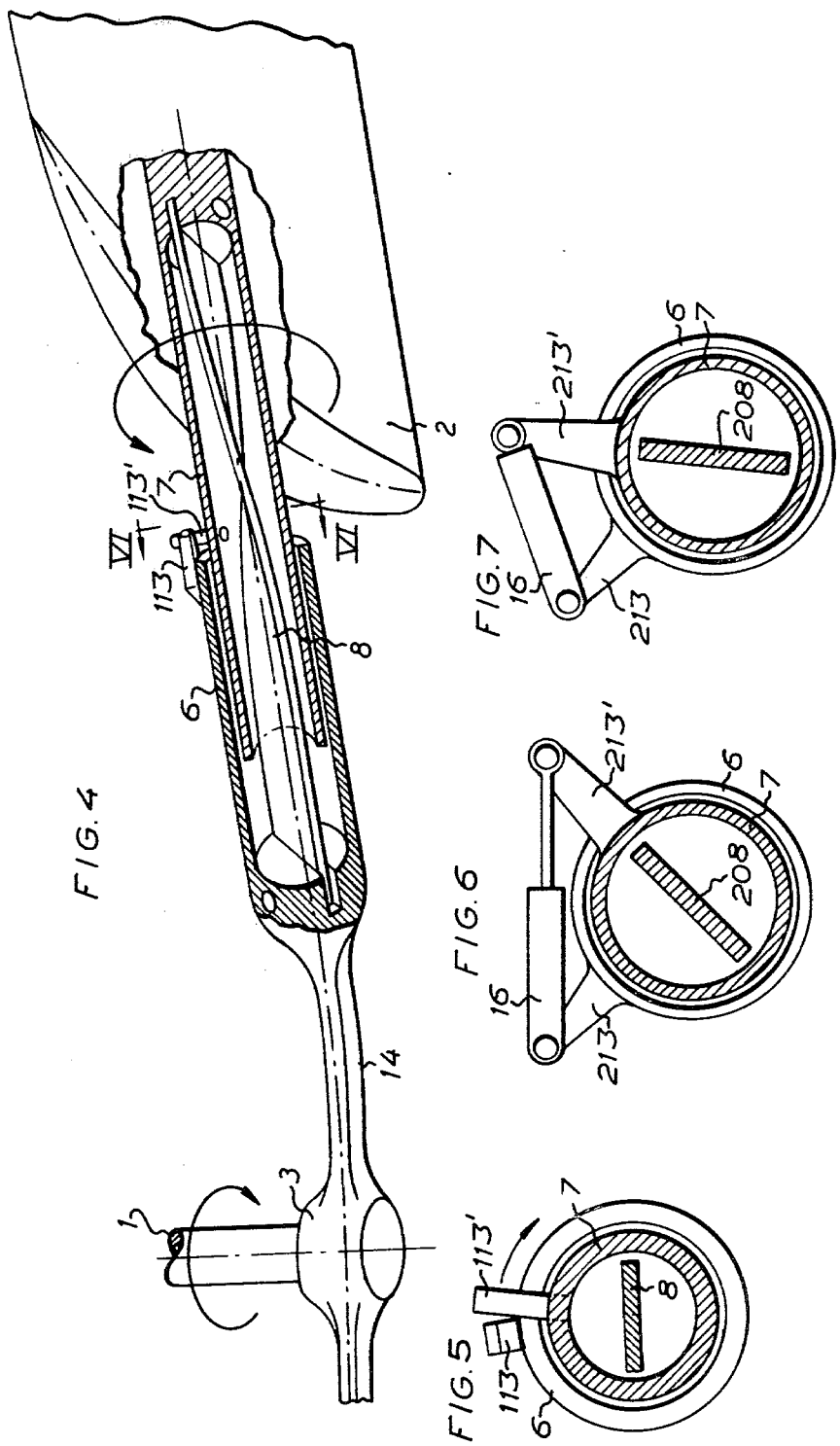

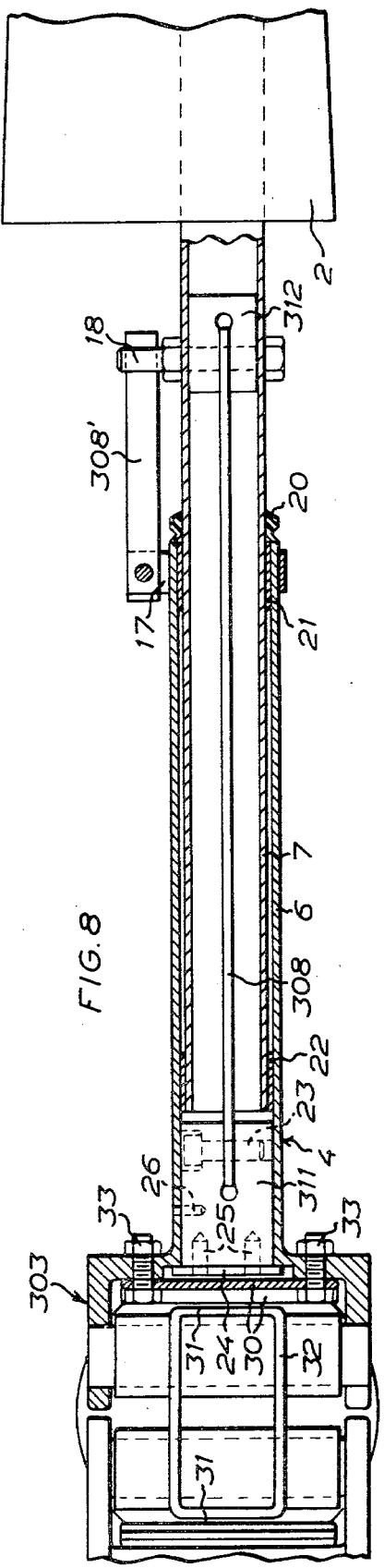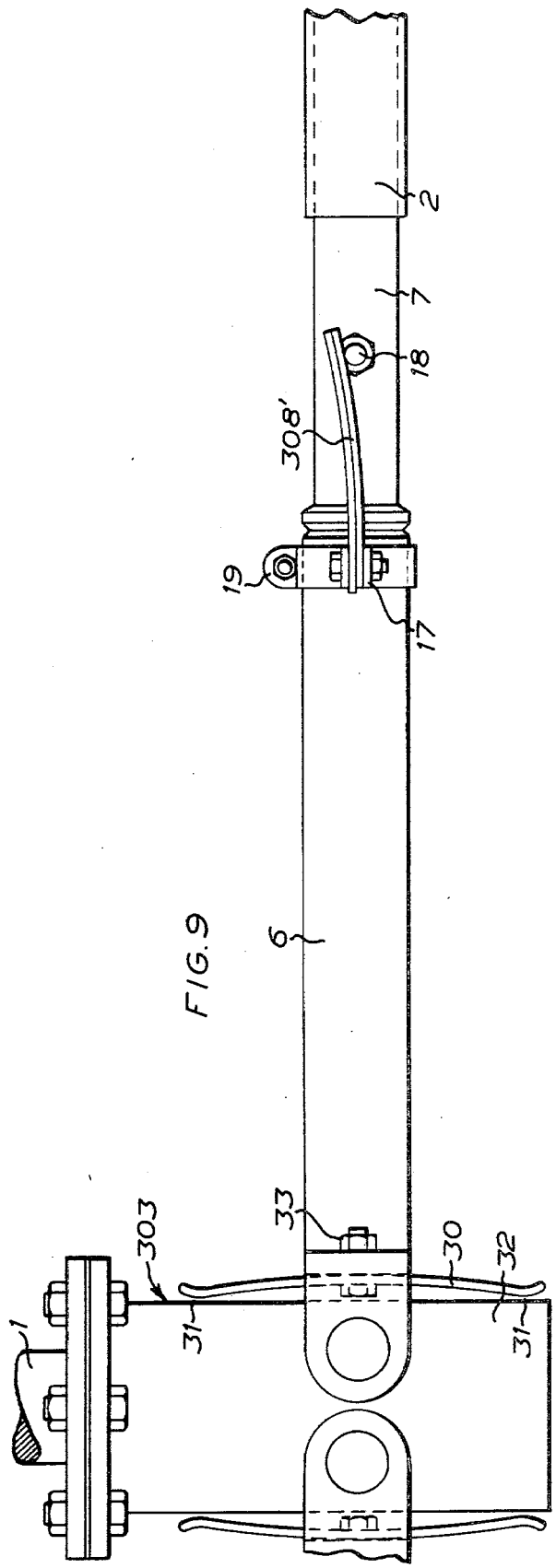
FIG.8
FIG.9

AUTOMATIC REGULATING DEVICE FOR KEEPING CONSTANT THE SPEED OF WIND-POWERED PROPELLERS

BACKGROUND OF THE INVENTION

This application is a continuation-in-part of copending application Ser. No. 897,241, filed Apr. 18, 1978, which in turn is a continuation of copending application Ser. No. 683,895, filed May 6, 1976, both now abandoned.

It is previously known to arrange the sails of a wind wheel as self-adjusting in dependence upon the strength of the wind in order to keep the speed of the wind wheel as constant as possible whenever the wind strength exceeds a lower limit.

A prior art construction of this type is characterized in that the sail covering is applied to a resilient frame which permits inclination of the sails in dependence upon the strength of the wind. According to another prior art proposal, the turbine in wind turbines is to consist of a spoked wheel with sail blades in the form of sailcloth pieces stretched between the hub and an outer ring supported by the spokes, the sail blades being connected to springs which are arranged such that they tend to retain the surfaces of the blades in a plane at right angles to the direction of the wind. Moreover, certain members such as washers are to be connected to the sail blades and are intended to permit rotation of the sail blades by the action of the air resistance and against the action of the springs. The springs should be dimensioned such that the effective wind-accommodating surface of the sail blades is automatically changed with the strength of the wind and with the load and such that the turbine wheel is thereby automatically regulated for keeping the speed constant.

None of these prior art apparatuses is directed to a wind wheel with rigid blades and devices for achieving automatic blade adjustment, merely by blade rotation and thus without blade deformation, for keeping the speed constant.

However, such a device is taught in German Pat. No. 904,400 which is directed to a wind wheel with adjustable rigid blades which are adjustable by means of the play of force between the wind-strength moment about the axes of rotation of blade roots rotatably journaled in the hub and of the torque on the wheel determined by the load on the wind wheel. In this prior art device, the aerodynamic point of gravity of each wing and the axis of rotation of the wing, i.e, the longitudinal axis of the blade root, are offset in relation to each other and the force transmission portion of the wind wheel (a gear wheel) is journaled coaxially and rotatably on the shaft or hub of the wind wheel and connected to the adjustable blade roots by means of carriers.

This prior art speed regulator has several disadvantages. It is, for example, mechanically complicated, and the above-mentioned offsetting of the aerodynamic point of gravity of each blade from the axis of rotation of the blade entails that the blade root is exposed to an unnecessarily large bending moment.

The present invention has been arrived at with due regard to these deficiencies and may improve a device indicated by way of introduction to such an extent that the above-described disadvantages are substantially eliminated.

SUMMARY OF THE INVENTION

The invention provides an automatic speed-regulating device in wind-powered propellers in which each propeller blade is connected to the hub by means of a torsion spring and is rotatably journaled relative to the hub for rotary movement about a geometric axis which is substantially at right angles to the axis of rotation of the propeller, and which blade is of such shape that wind forces acting on the blade exercise, because of the curvature of the blade profile mean chord, a torque on the blade about the abovementioned axis against the action of the torsion spring, the blade having, for the purposes of this journaling, a portion which is rotatably journaled relative to a hub portion supported on the hub, these portions having a common longitudinal axis which coincides with the above-mentioned geometric axis, and being connected to each other by means of the torsion spring.

According to the present invention, one end portion of the torsion spring is pre-stressed between two abutments which are radially spaced in relation to the hub, are spaced from each other, and are both connected to one of the abovementioned portions, i.e., the abovementioned blade portion or the above-mentioned hub portion, and is connected with its other end portion to the other of the above-mentioned portions such that the spring, in its entirety, exercises an elastic torque between these portions, and the torque exercised by the wind forces on the propeller blade will thereby be counterbalanced by the elastic torque from the pre-stressed torsion spring portion.

The nature of the invention and its aspects will be more fully understood from the following description of the drawings and discussion relating thereto.

In the accompanying drawings:

FIG. 1 is a perspective view of a portion of a propeller which is shown partly in section for illustrating a regulating device according to the invention functioning between a propeller blade and the propeller hub;

FIGS. 2 and 3 schematically show two different adjustment positions of the propeller blade in FIG. 1, there having been drawn in FIGS. 2 and 3 speed vectors and other units which are known but which are of interest for the regulation principle according to the present invention;

FIG. 4 is a perspective view, partly in section, of another embodiment of the invention;

FIG. 5 is a view in transverse section taken along the line VI—VI of FIG. 4, looking in the direction of the arrows;

FIGS. 6 and 7 illustrate a modification of the propeller regulator shown in FIG. 5 in which a damping cylinder is provided to prevent sudden springback in gusty wind;

FIG. 8 is a view in longitudinal section of a further embodiment of the invention; and FIG. 9 is a view of the device shown in FIG. 8 as seen when looking in a direction at 90° to the axis of propeller rotation.

Figure 1:
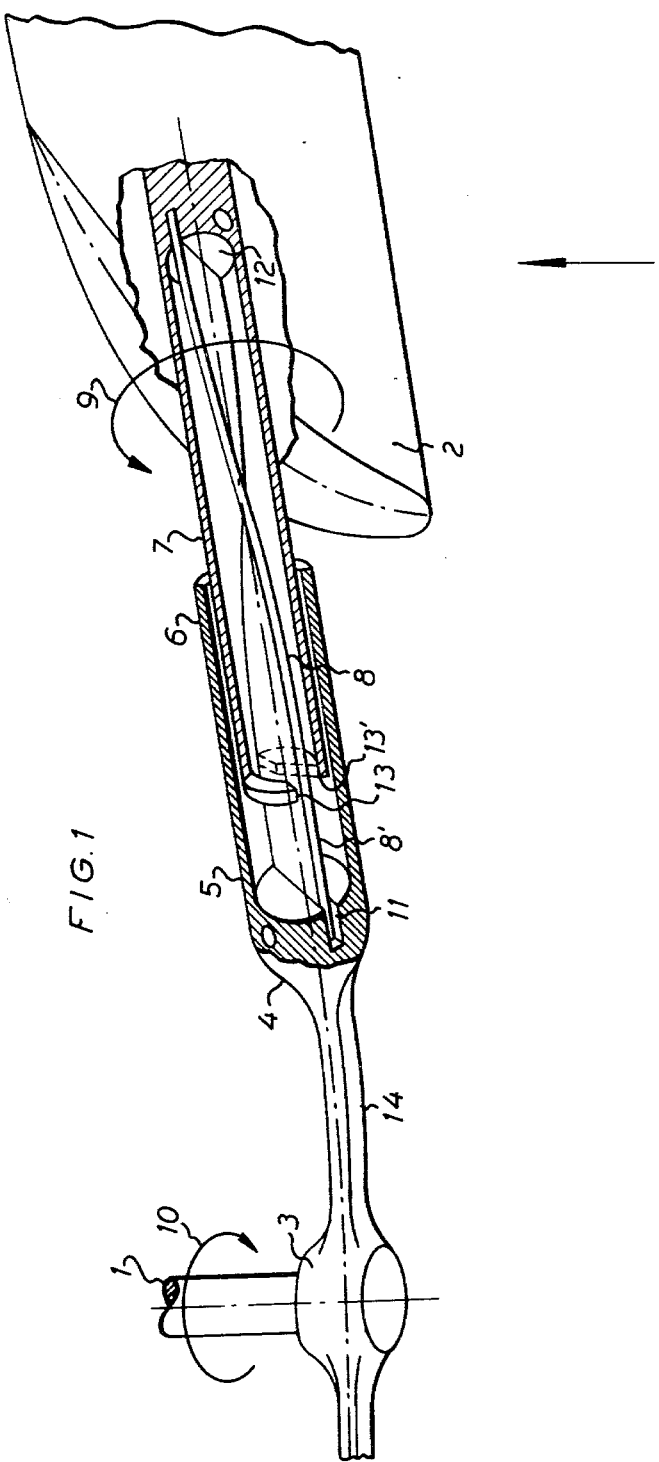

The propeller shown only partially in FIG. 1 is used as a wind motor for driving a load, for example, an electric generator, via a drive shaft 1. The propeller blades, of which only the inner portion of one blade 2 is shown, are each rotatably connected to the propeller hub 3 by means of a regulating device according to the invention which is enclosed in a hollow portion of the blade root 4 provided as a housing for the regulating device.

This housing, which is designated 5, consists of two tubular portions 6, 7, of which one portion 6 is connected to or integral with the hub 3, whereas the second portion is connected to the propeller blade 2. The first portion, for example tubular portion 7 shown in the drawing as connected to the propeller blade 2, extends into the second portion 6 and is rotatable and shiftable in relation thereto. Both portions 6, 7 of the housing 5 are united by means of a torsion spring 8 mounted in the housing 5 and being, in the illustrated embodiment, in the form of a leaf spring. At its radially located end in relation to the outer end of the hub 3, the spring 8 is connected to the blade 2 at a spring anchorage point 12 and is, at its opposite end, connected to the hub at an anchorage point 11 at the radially inner end of the housing portion 6. The spring 8 forms a torque transferring member between the blade 2 and the hub 3. In the radially inner end of the outer housing portion 7, there is fixedly mounted an abutment consisting of two parts 13, 13' for the spring 8 which is pre-stressed between this abutment and the blade anchorage point 12 for the radially outer blade end. It should be particularly observed that this pre-stressing is an internal pre-stressing of a major section of the spring 8 in one and the same portion—in this case, the portion 7 connected to the blade 2 (but it could also be the portion 6 connected to the hub 3); and that the radially inner spring portion, designated 8', serves as a connection for the pre-stressed spring portion in relation to the hub 3. As is illustrated in FIG. 1, the opposite edge portions of the spring 8 abut against two diametrically located support surfaces on both parts 13, 13' of the abutment. In the illustrated embodiment, these parts have two other surfaces serving as stops against which the spring comes into abutment after turning of the blade (during increased spring tension) in the direction indicated by the arrow 9. These stop surfaces can permit a turning of the spring 8 through, for example, 90° before the spring reaches them. Thus, the abutment 13, 13' for pre-stressing the torsion spring 8 allows the propeller blade 2 to be turned in the direction indicated by the arrow 9 during increased spring tension.

The above-mentioned arrow 9 shows, on the drawing, the torque exercised on the propeller blade by the action of the wind. Moreover, an arrow 10 shows the direction of rotation of the shaft 1.

The desired speed of the shaft 1 is preset by pre-stressing of the spring 8. In the illustrated embodiment, the spring 8 is pre-stressed between the anchorage point 12 and the abutment 13 in the tube portion 7. Alternatively, the spring can be pre-stressed along its opposite end portion between the anchorage point 11 and the outer end of the radially inner housing portion 6.

The pre-stressing of the spring 8 determines the basic adjustment of the speed. If any of the points 11 or 13, 13' are made adjustable, the basic adjustment of the blade angle can be subsequently set and, if the anchorage point 12 is made adjustable, the speed adjustment can, naturally, be varied.

The regulation by automatic blade adjustment according to the invention is based on the fact that a curved wing profile (please see FIGS. 2 and 3) provides a torque in an air current independent of the available driving force or the available lifting power on the wing. In this case the torque is proportional to the square of the speed at normal subsonic speeds. The curvature of the mean chord $K_m$ (please see FIG. 2) gives, thus, a torque about the axis A of the blade, which here coincides with the axis of the blade root (the blade is pivotal about this axis by means of the wind forces) and which acts in the direction of the arrow V (FIG. 2) and is counterbalanced by the torsion spring 8.

This principle differs from the prior art as taught in German Pat. No. 904,400 described by way of introduction. According to this known regulation process, the propeller blade is pivotally retained ahead of the point of attack of the resultant of the wind force, whereby the regulation will be dependent upon the size of the lifting force, which in turn causes secondary problems.

FIG. 2 shows the initial position of the wing under conditions of complete calm (the angle $\alpha$ is smallest) or, at most, the strength of relative wind u on the wing, this strength having an effect on the wing profile of a moment Mu which is equal to the moment $M_f$ pre-stressed in the spring 8 between the points 12 and 13 in FIG. 1.

L is resultant of the wind force which acts on the wing and can be divided into the force composants F and P, in which F is the driving force in the direction of rotation and P is axial to the pressure force acting axially on the generator shaft.

If the wind speed increases (FIG. 3) or the braking moment of the generator decreases, the speed will increase relative to the wind $u+\Delta u$, the wind force moment being then $Mu+\Delta Mu$. In this event, the wing is turned an angle $\Delta a$ by turning in the bearing which the housing 5 forms against the action of the pre-stressing of the spring 8. Thereby the angle of incidence $\alpha 1$ reduces to the angle $\alpha 2$ which gives the wind profile reduced lifting power and thereby reduced driving force $F_2$ in the direction of rotation.

In the speed vectors shown in the drawings, v indicates the rotation speed of the profile, S the wind speed through and normal to the plane of rotation of the propellers and u the strength of relative wind on the wing profile as the resultant of v and S.

It is generally valid that when a wind blows upon a wing with a speed of u and an angle of incidence of $\alpha$, a resultant force L is obtained which is designated the lifting force and is almost at right angles to the blowing direction for small angles $\alpha$. Moreover, the wing profile is influenced by a tilting moment if its mean chord is curved. The forces increase by the square of the blowing-on speed. Data of the profile is catalogued for a large number of different wing profiles, for which reason it is easy to calculate the size of these forces in the event of a known blowing-on speed.

The following practical Example, in which the designations shown in FIGS. 1 and 2 will be used, illustrates the association which is utilized according to the invention for the purposes of speed regulation.

Assume that the wind speed (unbraked) $S_2$ is 12 m/sec.; that a practically available power is 25 kW; that the propeller diameter is 10 m and the calculated radius of the propeller r is $(2R)/(3)$; that the speed n is 125 rpm and that the angle $\alpha$ is 4°.

At the above-disclosed power output, $S_1$ is equal to $\frac{2}{3} \cdot S_2 = 8$ m/sec. (cf. the vector diagram for FIG. 2) in which case $v_1 = 2\pi \cdot \frac{2}{3} R \cdot (n/60) = 43.63$ m/sec., $a + \alpha_1 = 10.39$ and $u_1 = 44.35$ m/sec.

If the power output from the generator were now suddenly to cease and it were not possible to regulate the speed, the propeller would race. However, it is supposed that the speed regulation allows a maximum 5% permitted speed increase, the following figures being then obtained (according to the speed vector in FIG. 3):

$S_2 = (3/2) \cdot 8 = 12$ m/sec.; $v_2 = 1.05 \cdot 43.63 = 45.81$ m/sec; $a + \Delta a + \alpha_2 = 14.68°$. From this it follows that $u_2 = 37.35$ m/sec. and that the angle of incidence of the wind has changed about 4.3° (14.68°−10.39°).

It is supposed that the requirement $L=0$ is satisfied (a far too stringent requirement, which it will be supposed is satisfied for the simplification of the following reasoning).

Data for the wing profile in question shows that this requirement is satisfied for $\alpha = -3$ from which it follows that $\alpha$ is to be reduced from +4° to −3°, that is to say, the wing profile is to be turned by the extra moment $\Delta M_u$ first 4.3° and then yet another angle and totally 11.3°.

$\Delta M_u$ is initiated by $u_2 = u_1 = 3$ m/sec., which corresponds to a speed increase of 6.77% which in turn gives $\Delta M_u$ an increase of about 14%.

The spring constant should thus be less than (14%)/(11.3°), this is to say, 1.24% per degree.

The pre-stressing moment has earlier been calculated and adjusted to a value of 5.2 kpm. The change in the spring moment in the Example should thus be 1.24% of 5.2 per degree of rotation, that is to say, 0.065 kpm/degree. The dimensioning of the spring can be calculated herefrom.

If one considers the extreme case that S is greater than v, it will be readily observed that the speed of the propeller can reduce and that the propeller can even rotate backwards. Consequently, both portions 6, 7 of the housing 5 are provided with a device (not shown) for restricting movement in the direction corresponding to reducing speed. Those surfaces of the abutment 13, 13' which form stops for the spring 8 after turning of the blade 2 through a maximum angle in the direction indicated by the arrow 9 are, in theory, unnecessary, but are preferred as a means for preventing overloading of the spring. The inner portion 8' of the spring, or a resilient portion, for example, anchorage point 11, or a slender, resilient inner root profile portion may be provided to damp the mass forces which the propeller blade can give when it turns about its axis against the pre-stressing and stop surfaces of the abutment 13, 13' which are separated by 90°.

It will be apparent from the above that the structurally very simple device according to the invention satisfies the requirements for effective speed regulation and that the pre-stressing of the spring 8 in the hollow blade root portions 6, 7 formed relative to each other determines the speed of the propeller.

In the embodiment shown in FIGS. 4 and 5, the spring is maintained in pre-stressed condition by an abutment 113 disposed on the outer tubular portion 6 which cooperates with another abutment 113' on the inner tubular portion 7. Either of these abutments can be adjustable to permit optional presetting of the spring 8. The spring tension normally keeps the abutments in engagement. At increasing wind, the propeller blade can also in this case be turned about its longitudinal axis by the torque exerted by the wind force to a point where torque is counterbalanced by the elastic torque from the pre-stressed torsion spring 308, whereby the rotational speed of the propeller will be maintained substantially constant. In this embodiment, the damping spring portion 8' of FIG. 1 is lacking.

If desired, a damping cylinder 16, cooperating with or replacing the damping spring 8' in FIG. 1, can be arranged between the abutments 213, 213' on the outer and inner tubular portions 6 and 7, respectively, to prevent abrupt spring-back in gusty wind.

FIG. 6 shows a position of the piston in the cylinder 16 and of the abutments 213, 213' corresponding to a full-fluted blade, while FIG. 7 shows the home or basic position.

The cylinder 16 in FIGS. 6 and 7 can also be a controllable operating cylinder instead of a damping cylinder and used for presetting the spring bias, for instance, for testing the best basic position of the spring 8 before windpowered propellers with an automatic speed regulator according to the invention are mass-produced. In mass production, use is preferably made of the embodiment in FIG. 1 which is considered to be the most advantageous.

In the form of the invention shown in FIGS. 8 and 9, the blade root 4 of the propeller blade 2 is secured to a propeller hub 303. Here, the two parts of the torsion spring, which correspond to the spring members 8 and 8' in FIG. 1, are constituted by two separate springs 308 and 308', respectively, the spring 308' being a damping spring disposed between two fastenings 17 and 18, respectively, on the outer sides of the tubular members 6, 7. One fastening 17 is preferably adjustable from the outer side by means of a clamping device 19. Between the tubular members 6, 7 are disposed a seal 20 and two bearings 21, 22.

The torsion spring 308 has one end secured at 312 in the tubular member 7 close to the propeller 2 and its other end secured in a spring attachment 311 which is rotatable and adjustably mounted in the tubular member 6 close to the hub 303. The spring attachment 311 extends from the hub 303 into the outer tubular member 6 and is connected to the spring 308 by means of a bolt 23. The spring attachment 311 can be rotated for presetting of the spring by means of a plate 24 mounted thereon by means of pins or bolts 25 and fixed to the tubular member 6 by means of a locking pin 26, which is insertable selectively in each of a series of angularly spaced apart holes in the tubular member 6 and in an opposite one of a corresponding series of holes in the spring attachment 311.

It should be observed that the damping spring 308' in FIGS. 8, 9, like the damping spring portion 8' in FIG. 1, forms an extension of the inner torsion spring 308. The difference is that the damping spring 308' extends back in a direction parallel with the torsion spring 308 and is placed outside the blade root members 6, 7. The spring 308' can be pre-stressed against the action of the inner torsion spring 308.

A damping spring 30 may be interposed between the hub 303 and the inner end portion of the tubular member 6 as shown in FIGS. 8 and 9. The blade root permits a small free tilting movement, known as flapping, of the propeller blade by resilience. This movement is attributable to gaps 31 existing between the spring 30 and the hub wall 32. When one or the other end portion of the spring 30 reaches the wall 32, the flapping movement is damped and stopped. The damping spring 30 is fixed to the hub 303 by means such as nut and bolts 33.

The specific embodiments described herein are intended to be only illustrative, and modifications in form and detail are possible within the scope of the invention as defined in the following claims.

I claim:

1. Apparatus for maintaining the rotational speed of a wind-powered propeller substantially constant at a preset value, comprising:
a hub rotatable about a first axis,
a plurality of propeller blades mounted on said hub and extending radially therefrom,
each of said blades having a root portion,
a hub portion secured to the hub,
a torsion spring connecting said root and hub portions such that the pitch of the blade is adjustable about a pivot axis substantially at right angles to the axis of rotation of the propeller, and
means for prestressing at least one portion of said torsion spring for presetting the pitch of said blade to a desired minimum value about said axis,
each of said blades having a curved mean profile chord and being so formed and disposed in relation to its pivot axis that the degree of torque exerted by wind forces acting on the blade against the action of said torsion spring is determined substantially solely by the curvature of the mean chord of the curved blade profile and substantially independently of any lifting force on the blade, the torque exercised by the wind forces being counterbalanced by the elastic torque from the prestressed torsion spring portion, whereby with increased wind force each blade is pivoted about its pivot axis from said preset pitch value to positions of increased pitch against the action of its torsion spring, and with decreasing wind force each blade is pivoted about its pivot axis towards said preset pitch value by the action of its torsion spring, such that the speed of the propeller is automatically maintained substantially constant over a range of variation in the wind force.

2. Automatic speed regulating apparatus as defined in claim 1 in which the prestressing means comprises abutment means radially spaced from the hub axis,
said abutment means includes a pair of abutment members angularly spaced with respect to said torsion spring and both fastened to one of said portions,
said torsion spring is fastened at one end thereof to said one of said portions and in engagement, at an intermediate point along its length, with one of said abutment members when said blades are in said preset pitch position; and
said torsion spring is movable out of contact with said one abutment member in the direction towards contact with the other abutment member as the wind speed increases and, at a high wind speed, engaging said other abutment member.

3. Automatic speed regulating apparatus as defined in claim 1, wherein:
said torsion spring is connected at one end thereof to said blade root portion and at the other end thereof to said hub portion;
said abutment means comprises a first abutment member fixed to one of said portions and engaging said torsion spring at an intermediate position between the ends thereof and exerting a tangential force in one direction thereon and permitting movement of said spring away from said abutment member in the other tangential direction; and
said torsion spring is torsionally prestressed between one end thereof and said abutment member.

4. Automatic speed regulating apparatus as defined in claim 3, wherein:
said abutment means comprises a second abutment member angularly spaced an intervening angle from said first-mentioned abutment member with respect to said geometric axis; and
said second abutment member is spaced from said torsion spring and is engaged thereby only after said torsion spring has moved at least partially out of contact with said first-mentioned abutment member and through said intervening angle.

5. Automatic speed regulating apparatus as defined in claim 1, wherein:
said blade root and hub portions comprise, respectively, a tubular member and a cylinder in which said tubular member is rotatably and slidably mounted;
said spring extends generally axially within said tubular member and is fixed at one end thereof to one end of said cylinder and is fixed at its other end to the end of said tubular member remote from said one end of said cylinder; and
said abutment means comprises an abutment member fixed to said tubular member and in engagement with said spring to torsionally prestress the portion of said spring between said abutment member and the end of the spring fixed to the end of said tubular member.

6. Automatic speed regulating apparatus as defined in claim 4, wherein:
said abutment means comprises a second abutment member fixed to said tubular member at a position angularly displaced from said first abutment member and at least partially out of engagement with said torsion spring;
said torsion spring is increasingly stressed torsionally as the wind acting on said propeller blades increases in velocity and, as the torsional stress on said spring reaches a certain magnitude, said spring moves at least partially away from said first abutment member and, with increasing torsional stress on said spring, through the intervening angle between said abutment members and into engagement with said second abutment member.

7. Automatic speed regulating apparatus as defined in claim 1 in which the torsion spring is connected to the hub by means of a resilient portion constituting an overload protection and damping device.

8. Automatic speed regulating apparatus as defined in claim 1 in which the torsion spring is mounted within two mutually pivotally journaled tubular members which form the hub and blade portions and together form power transmission means between said propeller blade and the propeller shaft, the prestressed spring portion being internally prestressed within one of said members.

9. Automatic speed regulating apparatus as defined in claim 1 comprising, in the region between the propeller shaft and the propeller blade, an element which has sufficient resilience to prevent the maximum permitted bending tension in the structure from being exceeded in the event of a maximum bending strain which a powerful gust of wind may occasion.

10. Automatic speed regulating apparatus as defined in claim 2 in which the abutment means comprises a pair of cooperating abutment members mounted on said respective blade portions,
said torsion spring is fastened at opposite ends thereof to said respective blade portions, said cooperating abutment members are adapted to be in engagement at a blade base position, and said torsion spring acts in a direction for relatively moving said abutment members to engagement with each other against the action of said torque, said apparatus further comprising resilient blade protection and damping means coupling said cooperating abutment members for overload protection and damping, said protection and damping means being prestressed relative to the torsion spring.

11. Automatic speed regulating apparatus as defined in claim 10, together with power actuated means interposed between said cooperating abutment members for adjusting the degree of prestress in said torsion spring.

* * * * *